US011915210B2

(12) United States Patent
Kang

(10) Patent No.: US 11,915,210 B2
(45) Date of Patent: *Feb. 27, 2024

(54) ANIMATED TWO-DIMENSIONAL BARCODE CHECKS

(71) Applicant: PAYPAL, INC., San Jose, CA (US)

(72) Inventor: Kenneth Kang, Campbell, CA (US)

(73) Assignee: PAYPAL, INC., San Jose, CA (US)

( * ) Notice: Subject to any disclaimer, the term of this patent is extended or adjusted under 35 U.S.C. 154(b) by 330 days.

This patent is subject to a terminal disclaimer.

(21) Appl. No.: 17/152,661

(22) Filed: Jan. 19, 2021

(65) Prior Publication Data

US 2021/0142296 A1 May 13, 2021

Related U.S. Application Data

(63) Continuation of application No. 15/665,195, filed on Jul. 31, 2017, now Pat. No. 10,896,409, which is a
(Continued)

(51) Int. Cl.
*G06Q 20/04* (2012.01)
*G06Q 20/10* (2012.01)
(Continued)

(52) U.S. Cl.
CPC ....... *G06Q 20/0425* (2013.01); *G06Q 20/108* (2013.01); *G06Q 20/20* (2013.01);
(Continued)

(58) Field of Classification Search
None
See application file for complete search history.

(56) References Cited

U.S. PATENT DOCUMENTS

| 5,742,263 A | 4/1998 | Wang et al. |
| 5,905,801 A | 5/1999 | Serinken |

(Continued)

FOREIGN PATENT DOCUMENTS

| CN | 1140981 A | * | 1/1997 | ............. G06K 1/121 |
| CN | 101002217 A | * | 7/2007 | ........... G06Q 10/087 |

(Continued)

OTHER PUBLICATIONS

Halal Food Recognition System Using Barcode. https://core.ac.uk/download/pdf/159178863.pdf (Year: 2010).*
(Continued)

*Primary Examiner* — El Mehdi Oussir
(74) *Attorney, Agent, or Firm* — Haynes and Boone, LLP

(57) ABSTRACT

Systems and methods are disclosed to provide an animated 2D barcode check that is used to securely and efficiently transmit financial information between mobile devices. The financial information includes a check written by a payer and transmitted to a merchant. The check includes account information of the payer and of the merchant with a payment service provider, a payment amount, and a cryptographic signature that has been certified by the payment service provider. The payer's mobile device encodes the check into a sequence of 2D barcodes and displays the sequence of 2D barcodes in a loop that is scanned by a camera on the merchant's mobile device. The merchant uses the cryptographic signature to verify the validity of the signature on the check without having Internet connectivity to the payment service provider. The merchant may later present the check to the payment service provider to receive payment.

20 Claims, 6 Drawing Sheets

Related U.S. Application Data continuation of application No. 13/168,671, filed on Jun. 24, 2011, now Pat. No. 9,721,237.

(51) Int. Cl.
   *G06Q 40/02* (2023.01)
   *G06Q 20/20* (2012.01)
   *G06Q 20/32* (2012.01)
   *G06Q 20/38* (2012.01)

(52) U.S. Cl.
   CPC ..... *G06Q 20/3274* (2013.01); *G06Q 20/3825* (2013.01); *G06Q 20/38215* (2013.01); *G06Q 40/02* (2013.01)

(56) References Cited

U.S. PATENT DOCUMENTS

| | | | |
|---|---|---|---|
| 6,205,433 B1 | 3/2001 | Boesch et al. | |
| 7,194,618 B1 | 3/2007 | Suominen | |
| 7,533,062 B2 | 5/2009 | Sanchez et al. | |
| 7,543,748 B2 | 6/2009 | Kiliccote | |
| 7,784,684 B2 | 8/2010 | Labrou et al. | |
| 8,032,397 B2* | 10/2011 | Lawless | G16H 40/67 |
| | | | 705/2 |
| 8,231,054 B1 | 7/2012 | Kim | |
| 8,256,673 B1 | 9/2012 | Kim | |
| 8,408,462 B2 | 4/2013 | Kim | |
| 8,418,922 B1 | 4/2013 | Kim | |
| 8,561,899 B2 | 10/2013 | Kim | |
| 8,688,579 B1* | 4/2014 | Ethington | G06V 10/44 |
| | | | 705/42 |
| 9,043,237 B2 | 5/2015 | McCarthy | |
| 9,881,006 B2* | 1/2018 | Ruvini | G06Q 30/0601 |
| 10,360,561 B2* | 7/2019 | Poon | G06Q 20/3229 |
| 10,997,549 B2* | 5/2021 | Narasimhan | G06F 16/9535 |
| 11,544,513 B1* | 1/2023 | Sanderson | G06K 19/06046 |
| 2002/0026478 A1 | 2/2002 | Rodgers et al. | |
| 2002/0037097 A1 | 3/2002 | Hoyos et al. | |
| 2002/0091638 A1 | 7/2002 | Hirota et al. | |
| 2002/0130065 A1 | 9/2002 | Bloom | |
| 2002/0177922 A1 | 11/2002 | Bloom | |
| 2002/0178074 A1 | 11/2002 | Bloom | |
| 2003/0161475 A1 | 8/2003 | Crumly et al. | |
| 2004/0223197 A1 | 11/2004 | Ohta et al. | |
| 2004/0247206 A1 | 12/2004 | Kaneda et al. | |
| 2005/0038794 A1 | 2/2005 | Piersol | |
| 2005/0049890 A1 | 3/2005 | Kan | |
| 2005/0092844 A1 | 5/2005 | Zhang et al. | |
| 2005/0105148 A1 | 5/2005 | Misawa | |
| 2005/0123209 A1 | 6/2005 | Kitora et al. | |
| 2005/0133594 A1 | 6/2005 | Brookner | |
| 2006/0020366 A1 | 1/2006 | Bloom | |
| 2006/0045386 A1 | 3/2006 | Fukuoka et al. | |
| 2006/0157574 A1 | 7/2006 | Farrar et al. | |
| 2007/0095909 A1 | 5/2007 | Chaum | |
| 2007/0245397 A1 | 10/2007 | James et al. | |
| 2008/0130943 A1 | 6/2008 | Goda | |
| 2008/0132311 A1* | 6/2008 | Walker | G06Q 50/34 |
| | | | 463/16 |
| 2008/0262969 A1 | 10/2008 | Samid | |
| 2008/0294536 A1 | 11/2008 | Taylor et al. | |
| 2009/0204530 A1* | 8/2009 | Hanson | G06Q 20/14 |
| | | | 713/176 |
| 2009/0240626 A1 | 9/2009 | Hasson et al. | |
| 2009/0254485 A1* | 10/2009 | Baentsch | G06Q 20/3829 |
| | | | 705/71 |
| 2009/0316909 A1 | 12/2009 | Futa et al. | |
| 2010/0049661 A1 | 2/2010 | Lima | |
| 2010/0076994 A1 | 3/2010 | Soroca et al. | |
| 2010/0097661 A1 | 4/2010 | Hoblit | |
| 2011/0046775 A1 | 2/2011 | Bailey et al. | |
| 2011/0112898 A1 | 5/2011 | White | |
| 2011/0161076 A1* | 6/2011 | Davis | H04M 1/72448 |
| | | | 704/E15.001 |
| 2011/0251892 A1 | 10/2011 | Laracey | |
| 2012/0067943 A1 | 3/2012 | Saunders et al. | |
| 2012/0150669 A1 | 6/2012 | Langley et al. | |
| 2012/0290478 A1* | 11/2012 | Crofts | G06Q 20/322 |
| | | | 705/44 |
| 2012/0303425 A1* | 11/2012 | Katzin | G06Q 20/4016 |
| | | | 705/16 |
| 2013/0191213 A1* | 7/2013 | Beck | G06Q 30/0207 |
| | | | 705/14.64 |
| 2014/0162598 A1* | 6/2014 | Villa-Real | G06Q 20/4014 |
| | | | 455/411 |
| 2015/0026072 A1* | 1/2015 | Zhou | G06Q 20/401 |
| | | | 705/41 |
| 2016/0012465 A1* | 1/2016 | Sharp | G06Q 20/321 |
| | | | 705/14.17 |
| 2016/0143075 A1 | 5/2016 | Tucker et al. | |
| 2018/0018644 A1* | 1/2018 | Kang | G06Q 20/20 |
| 2019/0080307 A1* | 3/2019 | Katzin | G06Q 20/386 |

FOREIGN PATENT DOCUMENTS

| | | | | |
|---|---|---|---|---|
| CN | 103984976 A | * | 8/2014 | ............ G06F 21/44 |
| CN | 111340465 A | * | 6/2020 | |
| EP | 2073160 A1 | | 6/2009 | |
| JP | 2008511934 A | * | 8/2005 | |
| WO | WO-2007069917 A1 | * | 6/2007 | ............ G06Q 30/02 |
| WO | WO-2007072044 A1 | * | 6/2007 | ........... G03G 21/046 |
| WO | WO-2009070114 A1 | * | 6/2009 | ........... G06Q 20/042 |
| WO | WO-2009081146 A1 | * | 7/2009 | ............ G06Q 10/06 |
| WO | WO-2012142740 A1 | * | 10/2012 | ............ G06Q 20/20 |
| WO | WO2017194024 | | 11/2017 | |
| WO | WO-2019057029 A1 | * | 3/2019 | ........... G06Q 20/322 |

OTHER PUBLICATIONS

Dodson et al.; Secure, Consumer-Friendly Web Authentication and Payments with a Phone. https://eudl.eu/pdf/10.1007/978-3-642-29336-8_2 (Year: 2012).*

Froihofer et al. QR-TAN: Secure Mobile Transaction Authentication. IEEE 2009. https://citeseerx.ist.psu.edu/document?repid=rep1&type=pdf&doi=c0ac1736fc726189175e06c98919b7b362a7bb8f (Year: 2009).*

Annika Hinze, K. S. (Jul. 2009). Event-Based Applications and Enabling Technologies. Nashville, TN, USA. (Year: 2009).

* cited by examiner

ANIMATED TWO-DIMENSIONAL BARCODE CHECKS

CROSS-REFERENCE TO RELATED APPLICATIONS

This application claims priority to and is a continuation of U.S. patent application Ser. No. 15/665,195 filed Jul. 31, 2017, issued as U.S. Pat. No. 10,896,409 on Jan. 19, 2021 and is a continuation of U.S. patent application Ser. No. 13/168,671, filed Jun. 24, 2011 and issued as U.S. Pat. No. 9,721,237 on Aug. 1, 2017, which is hereby incorporated by reference in its entirety.

TECHNICAL FIELD

The present disclosure relates generally to financial transactions conducted via a user device. In particular, the present disclosure relates to methods and systems for using animated two-dimensional (2D) barcode checks on a user device to facilitate payment transactions.

BACKGROUND

Mobile phones are increasingly being used in conjunction with on-line payment service providers, such as PayPal, Inc. of San Jose, CA With the ever-increasing popularity of mobile devices such as smart phones and of Internet commerce, both consumers and sellers are using mobile devices to conduct financial transactions between parties, whether they are individuals or companies. For example, a consumer may launch a web browser on a mobile device to connect with a payment service provider over the Internet to request an on-line payment. The consumer may access his or her on-line account, provide payment information, and authorize the payment service provider to transfer funds from the consumer's account to a merchant's account. A confirmation message may then be sent to the consumer's or the merchant's mobile devices to complete the transaction. However, to facilitate payment transactions, and to enable payment transactions even when there is no Internet connectivity, it is desirable for a consumer's mobile device to communicate directly with a merchant's mobile device. For example, the consumer may use the mobile device to transmit information such as his or her account information and payment amount to the merchant's mobile device to authorize the payment. The merchant may later connect with the payment service provider for transmission of the information received from the consumer to complete the transaction.

While technologies such as near-field communication (NFC) and Quick Response (QR) codes have been proposed for secure communication of financial information between mobile devices, they suffer from various deficiencies. For example, NFC requires the installation of NFC-capable hardware and software on the mobile devices of both parties, thus increasing cost for users. QR code is a two-dimensional barcode (2D barcode) that may be displayed by a mobile device and scanned by a camera on another mobile device to communicate between mobile devices. However, a QR code is limited in the amount of data encoded therein, making its use impractical for the transmission of large amounts of data that may be encountered in a financial transaction. In addition, mobile devices may vary greatly in display and camera capabilities, making it difficult for a mobile device with a low resolution camera to accurately capture information encoded in a large QR code. Furthermore, accurate scanning of a large QR code may be time consuming and may require perfect focus or alignment of the scanning camera with the display, further limiting its ease of use. Accordingly, there is a need for a way to securely, easily, and economically communicate financial information between mobile devices to facilitate financial transactions.

BRIEF SUMMARY

Systems and methods are disclosed herein to provide an animated 2D barcode check that may be used to securely and efficiently transmit large amounts of financial information using one or more mobile devices. In one embodiment, a consumer may encode payment information for a check into a sequence of 2D barcodes for display on the consumer's mobile device. The sequence of 2D barcodes may contain a cryptographic signature of the consumer to authorize a payment from the consumer's account with a payment service provider to a merchant. The mobile device displays the sequence of 2D barcodes in a loop to create an "animated" 2D barcode that may be scanned by a camera on the merchant's mobile device to capture the payment information encoded therein. Because a sequence of 2D barcodes is used, there is no limit on the amount of data transmitted. Each frame of the animated 2D barcode may be made suitably smaller, increasing the chance that the frame will be accurately scanned and decoded using a low resolution camera. Moreover, a small barcode may be scanned faster since it is less sensitive to variations in focus or alignment of the camera with the barcode. The merchant may use the cryptographic signature to verify the validity of the signature on the check. The merchant may later present the check to the payment service provider to receive payment. As a result, the consumer and merchant may securely communicate financial data without having Internet connectivity to the payment service provider. A user may also be able to convey large amounts of data or information securely through a sequence of 2D barcodes, where each barcode in the sequence contains a different portion of the data or information to be conveyed. Identifiers embedded in the barcodes allow the device capturing the barcodes to start capturing from any barcode in the sequence and to know when a complete sequence is captured.

In accordance with one or more embodiments of the present disclosure, a method for communicating data is disclosed. The method includes encoding the data into a sequence of 2D barcodes, where each of the 2D barcodes is encoded with a partial amount of the data and a sequential identifier. The method also includes displaying the sequence of 2D barcodes sequentially in a continuous loop on a user device.

In accordance with one or more embodiments of the present disclosure, a method for communicating data is disclosed. The method includes scanning a sequence of 2D barcodes displayed in a continuous loop on a display device to generate a sequence of scanned frames on a user device. Each of the 2D barcodes is encoded with a partial amount of the data and a sequential identifier. The method also includes decoding the sequence of scanned frames to reconstruct the data.

In accordance with one or more embodiments of the present disclosure, a method for conducting a financial transaction is disclosed. The method includes certifying a public key. The method further includes receiving a payment instrument. The payment instrument includes the certified public key and information on a payer and information on a payee. The payment instrument includes data decoded from a sequence of 2D barcodes. The method further includes verifying the certified public key. The method further includes transferring funds from an account of the payer to an account of the payee.

In accordance with one or more embodiments of the present disclosure, a non-transitory computer readable medium having computer readable code for execution by a processor of a user device to perform a method of communicating data is disclosed. The method includes encoding the data into a sequence of 2D barcodes, where each of the 2D barcodes is encoded with a partial amount of the data and a sequential identifier. The method also includes displaying the sequence of 2D barcodes sequentially in a continuous loop on the user device.

In accordance with one or more embodiments of the present disclosure, an apparatus for communicating data is disclosed. The apparatus includes a processor. The apparatus also includes a camera. The camera is used to scan a sequence of 2D barcodes displayed in a continuous loop on a display device to generate a sequence of scanned frames. Each of the 2D barcodes is encoded with a partial amount of the data. The apparatus further includes a non-transitory computer readable medium having computer readable code for execution by the processor to perform a method. The method includes decoding the sequence of scanned frames to reconstruct the data.

These and other embodiments of the present disclosure will be more fully understood by reference to the following detailed description of the embodiments when considered in conjunction with the accompanying drawings.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Systems and methods are disclosed herein for secure and efficient communication of financial information using a mobile device to transmit or capture an animated 2D barcode to facilitate financial transactions. The financial information may include a payment instrument such as a check written by a payer and transmitted to a merchant to pay for goods or services received. The check may include account information of the payer and of the merchant with a payment service provider, a payment amount, a cryptographic signature or a signing certificate that has been certified by the payment service provider, and other secure information used by the merchant to verify the validity of the check. The financial information is segmented and encoded into a sequence of 2D barcodes, such as QR codes, that is displayed in a loop as an animated 2D barcode on the payer's mobile device. The merchant uses a camera on a mobile device to scan the animated 2D barcode to capture the financial information encoded therein. The merchant runs applications on the mobile device to decode the financial information and to preliminarily validate the check. Advantageously, financial information is communicated between the mobile devices without requiring Internet connectivity to the payment service provider. The merchant may later connect with the payment service provider to present the check for payment. Use of the animated 2D barcode enables secure transmission of financial information that often exceeds the size limit of data encoded by a static or single 2D barcode. In addition, the frame size and the playback speed of the animated 2D barcode may be tailored to suit the camera resolution of the capturing mobile device to enable accurate and convenient capture of the financial information. Animated 2D barcodes may also be used to transmit financial information other than information for checks, such as information for credit cards/debit cards, or gift cards to conduct payment transactions. It may also be used for a merchant to issue refund or credit back to the payer's account, or for other types of secure transactions.

Figure 1:
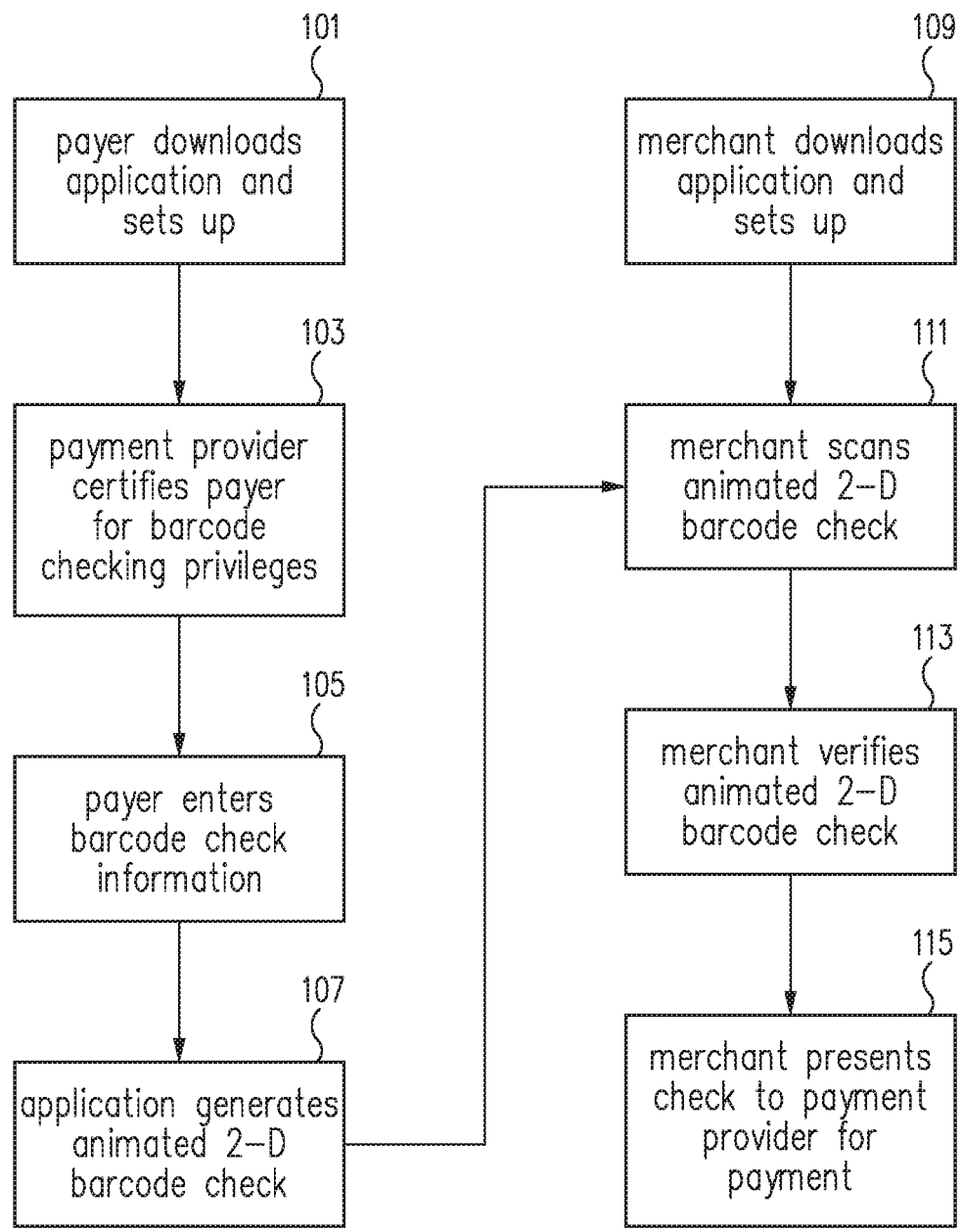
FIG. 1 shows a flow chart of the steps to perform on a payer's and a merchant's mobile device to communicate payment information between the mobile devices using an animated 2D barcode check according to one or more embodiments of the present disclosure.

Refer now to the figures wherein the drawings are for purposes of illustrating embodiments of the present disclosure only, and not for purposes of limiting the same. FIG. 1 shows a flow chart of the steps to perform on a payer's and a merchant's mobile device to communicate payment information between the mobile devices using an animated 2D barcode check according to one or more embodiments of the present disclosure.

Before using the mobile devices to conduct payment transactions, users of the mobile devices register with an on-line payment service provider, such as PayPal. In step 101, a payer accesses the payment service provider's website to register an account and to fund the account. The payer downloads a payment generation application from the payment service provider and installs it on the mobile device. The application may be used by the payer to enter signature information for generating a signing key. The user may also use the application to enter financial information to be encoded into the animated 2D barcode.

In step 103, the payer launches the application to generate a signing key or certificate for use on the 2D barcode check. The signing key/certificate may follow the X.509, OpenPGP, or S/MIME standard. After generating the key/certificate, the payer transmits the key/certificate to the payment service provider for certification. The payment service provider certifies the key/certificate and may embed additional capability notations into the key/certificate to restrict its use to certain types of payment transactions. For example, the key/certificate may be certified for use in payment transactions that do not exceed a maximum transaction amount or occur during a certain time period. The capability notations may be transmitted by the payment service provider back to the payer's mobile device.

In step 105, when the payer wishes to generate an animated 2D barcode for use as a payment instrument such as a check, the payer launches the application to enter information on the payment transaction. The information entered may include the name and account number of the payee or merchant, the payment amount, the check number, etc. The payer signs the check with the signing key/certificate that has been certified by the payment service provider in step 103. The application combines the entered information with the signing key/certificate and information on the payer such as the payer's name, account number to generate a check.

In step 107, the payer may use the application supplied by the payment service provider or another application to encode the check into a format suitable for generating an animated 2D barcode. For example, information on the check may be divided into data segments where the data segment size is determined by the data size of a single frame of the 2D barcode. This data segment size may be adjusted to accommodate the display resolution of the payer's mobile device and/or the scanning resolution of the camera on the merchant's mobile device. Each segment is encoded and converted into a frame of the sequence of 2D barcodes. To enable the display of the sequence of the 2D barcodes, each frame of 2D barcodes may have a number indicating its order within the sequence of frames. The mobile device displays the sequence of 2D barcodes in a loop to generate the animated 2D barcode check.

For a merchant to receive and to verify the information encoded in the animated 2D barcode check, the merchant also needs to register with the payment service provider. In step 109, the merchant accesses the payment service provider's website to register an account. The merchant also downloads a payment verification application from the payment service provider and installs it on the merchant's mobile device. The application may be used by the merchant to read the information decoded from the animated 2D barcode check and to verify the validity of the signing key/certificate. To guard against unauthorized or fraudulent use of the signing key/certificate, the merchant may download a certificate revocation list (CRL) from the payment service provider. The CRL lists non-expired signing keys/certificates that have been revoked and that should be rejected by the merchant. For example, CRL may list the keys/certificates of mobile devices that were reported stolen or the keys/certificates determined by the payment service provider to be fraudulent. The payment service provider may update the CRL at a regular interval, such as daily, to keep the CRL current. The application may check for updates to the CRL on the payment service provider's website and automatically download the latest CRL to the merchant's mobile device. After receiving a check, the merchant may compare the signing key/certificate against the CRL to reject the check if the key/certificate appears on the CRL.

In step 111, the merchant uses the camera on the merchant's mobile device to scan the animated 2D barcode check displayed on the payer's mobile device. The merchant may use existing 2D barcode reading software to capture and decode the sequence of 2D barcodes. Scanning may start from any frame of the sequence of 2D barcodes and may continue until all the frames of the sequence have been scanned. Because each frame has embedded data that indicates the frame's order within the sequence and data that indicates the total number of frames in the sequence, the 2D barcode reading software may determine if all the frames have been scanned. Each decoded frame represents one data segment of the check. Therefore, the 2D barcode reading software may reconstruct the check from all the decoded frames of the sequence of 2D barcodes. Because the frame size of the 2D barcode may be tailored to the scanning resolution of the camera on the merchant's mobile device, scanning is less sensitive to variations in focus or alignment of the camera. In addition, because smaller frame size may be scanned and decoded faster than larger frame size, frame size may be adjusted to improve the scanning speed. After the check is reconstructed from the decoded frames, the data may be passed to the payment verification application for verification and processing.

In step 113, the payment verification application verifies the validity of the signing key/certificate. For example, the signing/key may be verified using the RSA algorithm. The payment verification application also verifies that the signing key/certificate is certified by the payment service provider. If additional capability or notation is embedded into the key/certificate to restrict its use to certain types of payment transactions, the payment verification application may verify that the payment transaction satisfies the restriction. For example, the key/certificate is verified to confirm that it has not expired or that it is received during a valid time period, or that the payment amount does not exceed a maximum transaction amount. To guard against unauthorized use, the payment verification application compares the key/certificate against the CRL to reject the key/certificate if it appears on the CRL. Once the key/certificate is verified, the application may verify that other information, such as the payment amount and the merchant name or account number on the check, is correct. The merchant may then accept the check if all the information is correct. The application may display a message or generate an audible signal to indicate that the check has been accepted.

The merchant may receive checks from one or more payers. In step 115, the merchant accesses the payment service provider's website to present the checks for payment. The merchant may launch the payment verification application to transmit to the payment service provider the checks. For each check, the payment service provider verifies the key/certificate, the account number of the payer and the merchant, and that there are sufficient funds in the payer's account to cover the payment amount. The payment service provider transfers funds from the payer's account to the merchant's account to credit the merchant for the payment amount.

Figure 2:
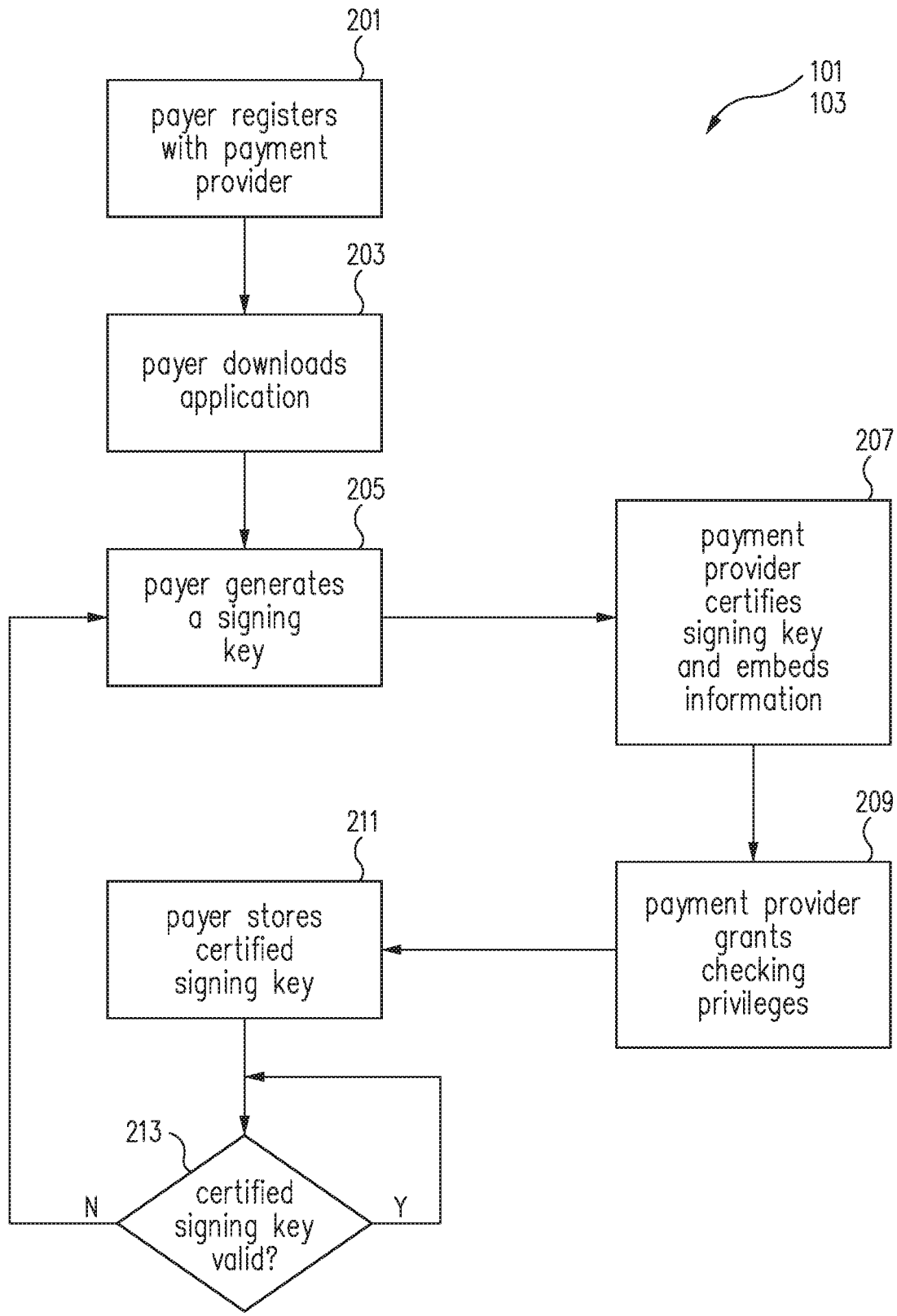
FIG. 2 shows a detailed flow chart of steps 103, 105 of FIG. 1 performed on a payer's mobile device for payer set up and signing key certification by the payment service provider according to one or more embodiments of the present disclosure.

FIG. 2 shows a more detailed flow chart of steps 103, 105 of FIG. 1 performed on the payer's mobile device for payer set up and signing key certification by the payment service provider according to one or more embodiments of the present disclosure.

In step 201, the payer registers an account with the payment service provider to sign up for payment transactions conducted from a mobile device using animated 2D barcode checks. Registration may be performed in any suitable fashion, such as by accessing the payment service provider's website and entering the required identification information. The payer may be asked to set up an account if one has not been established, or if an account has been established, to fund the account. The payer may also be asked to enter additional identification information, such as the phone number of the mobile device, financial information, billing address, security questions and answers, etc. The mobile device may be a smart phone (e.g., iPhone, Google phone, or other phones running Android, Window Mobile, or other operating systems), a tablet computer (e.g., iPad, Galaxy), personal digital assistant (PDA), a notebook computer, or various other types of wireless computing devices. Communication with the payment service provider may be provided through the Internet and/or one or more intranets, wireless networks (e.g., cellular, wide area network (WAN), WIFI hot spot, personal area network (PAN), Bluetooth), landline networks and/or other appropriate types of communication networks. As such, in various embodiments, the payer's mobile device may be associated with a particular link (e.g., a link, such as a URL (Uniform Resource Locator) to an IP (Internet Protocol) address).

In step 203, the payer downloads a payment generation application from the payment service provider for installation on the mobile device. The payment generation application enables the payer to generate a signing key and provides a user interface for the payer to communicate with the payment service provider for certification of the signing key. The payment generation application also provides a user interface for the payer to enter payment information and may call a 2D barcode generation software to encode the payment information into an animated 2D barcode.

In step 205, the payer launches the payment generation application to generate a signing key or certificate. The signing/certificate needs to be certified by the payment service provider and is attached to a check to allow a merchant to validate the check. The signing key/certificate may follow the X.509, the OpenPGP, or the S/MIME standard. The signing key/certificate is transmitted to the payment service provider for certification in step 207. The payment service provider verifies that the payer's account is properly set up and funded, and certifies the signing key/certificate. The payment service provider also embeds capability notations into the key/certificate to restrict its use. Such notations may restrict use of the signing key/certificate before an expiration date, to a maximum payment amount per transaction, a maximum number of transactions, and/or a maximum total payment amount for all transactions. For example, the signing key/certificate may have an expiration date that is one week to three months from the date the signing key/certificate is certified.

In step 209, the payment service provider transmits the capability notations back to the payer's mobile device and indicates to the payer that checking privileges have been granted. In step 211, the payer stores the signing key/certificate in the mobile device. Because the signing key/certificate may have an expiration date, in step 213, the payment generation application checks to see if the key is still valid. If the key/certificate has expired, the payment generation application prompts the payer to generate a new key/certificate. The payer may return to step 205 to generate a new key/certificate for certification by the payment service provider.

Figure 3:
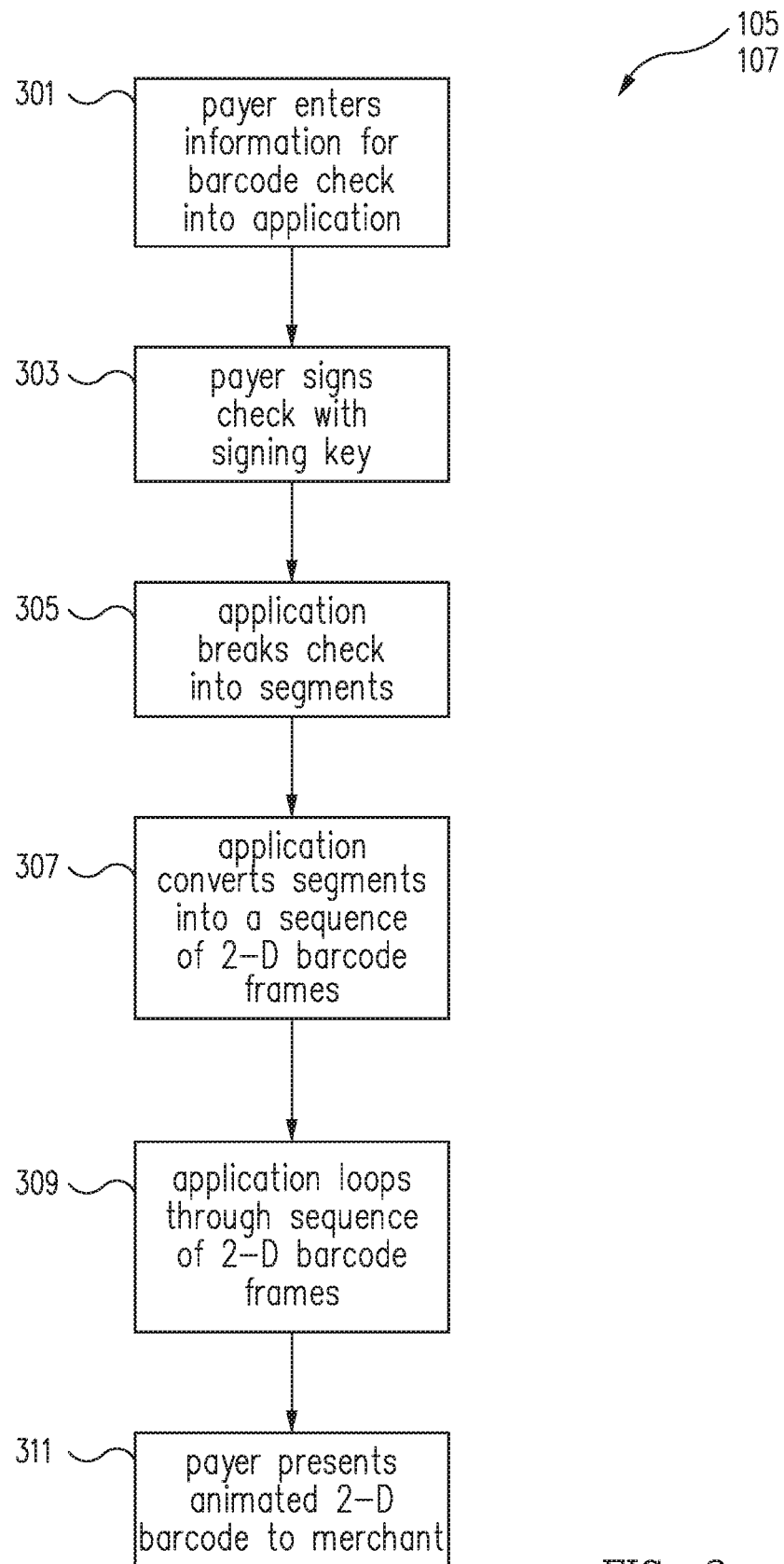
FIG. 3 shows a detailed flow chart of steps 105, 107 of FIG. 1 performed on a payer's mobile device for generating the animated 2D barcode check according to one or more embodiments of the present disclosure.

FIG. 3 shows a more detailed flow chart of steps 105, 107 of FIG. 1 performed on the payer's mobile device for generating the animated 2D barcode check according to one or more embodiments of the present disclosure. The payer visits a merchant to purchase goods or services. To pay for the purchase, the payer may launch the payment generation application on the mobile device to compose a check.

In step 301, the payer enters information to compose a check. The information may include the name and account number of the merchant, the payment amount, the date, a check number, and notes about the payment transaction. Alternatively, the payer may receive information about the merchant and the payment amount from the merchant's mobile device. For example, the merchant may use a barcode generating software to generate a 2D barcode or an animated sequence of 2D barcodes that encodes the name/account number of the merchant and the payment amount. The payer may use a camera on the payer's mobile device to scan the 2D barcode(s) and may use 2D barcode reading software to capture and decode the information from the merchant. The decoded information may then be imported into the payment generation application for the payer to compose the check. The payment generation application may fill in information about the payer on the check such as the payer's name and account number.

In step 303, the payer verifies that all the information for the check is correct and signs the check with the signing key/certificate. The payment generation application combines the information for the check with the stored signing key/certificate into a signed data block. In step 305, the payer uses the payment generation application or a 2D barcode generation software to divide the signed data block into data segments suitable for encoding into a sequence of 2D barcodes. The signed data block may be divided because it exceeds the maximum data size for encoding into a single frame of 2D barcode, or it may be divided because the density of the encoded 2D barcode exceeds the scanning resolution of the camera on a mobile device. For example, while the QR code standard has a maximum data size of 2953 bytes, most phone cameras lack the resolution to scan the density of a QR code that encodes this data size. Therefore, to accommodate the scanning resolution of a wide spectrum of camera phones, the size of the data segments to be encoded into a frame of a 2D barcode may be reduced below the maximum data size. Alternatively, the size of the data segments may be tailored to the scanning resolution of a camera, such as that of the merchant's mobile device. In addition, it may be advantageous to have smaller data segments so that the smaller 2D barcode frames encoded from the smaller data segments are less sensitive to variations in focus or alignment of the camera. Smaller 2D barcode frames are also read and decoded faster. Each data segment is encoded into a frame of the sequence of 2D barcodes. The data segment may be prefixed with a notation to indicate its frame number and the total number of frames in the sequence. For example, the data segment may have a "2 of 5" prefix to indicate that it is the second of a sequence of five frames of the animated 2D barcode.

In step 307, the data segments are encoded and converted into frames of the sequence of 2D barcodes. In step 308, payer's mobile device displays the sequence of 2D barcode frames in a continuous loop to generate the animated 2D barcode check. The time that each frame of the 2D barcode is displayed may be adjustable to accommodate the speed of the camera scanning the animated 2D barcode. For example, the mobile device may display each 2D barcode frame for a period of 100-1000 ms. In step 311, the payer presents the animated 2D barcode check to the merchant for scanning.

Figure 4:
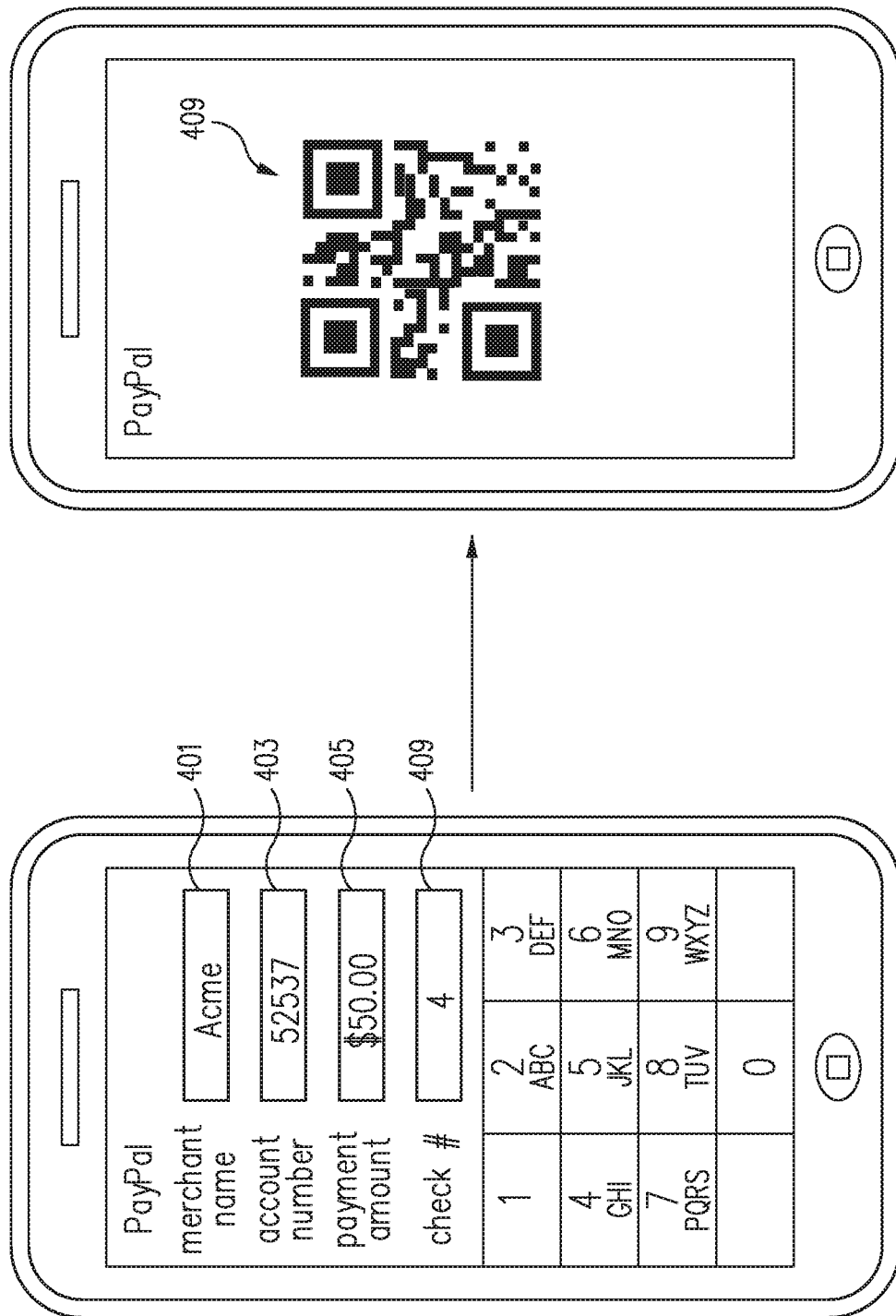
FIG. 4 shows a frame of an animated 2D barcode generated from a payer's mobile device according to one or more embodiments of the present disclosure.

FIG. 4 shows a frame of an animated 2D barcode generated from a payer's mobile device according to one or more embodiments of the present disclosure. The mobile device displays fields for the payer to enter a merchant name 401, a merchant's account number 403, a payment amount 405, and a check number 407. The payment generation application combines the entered information with information on the payer and a signing key/certificate to generate a signed data block of a check. The signed data block is segmented, encoded, and converted into frames of the animated 2D barcode for display in a continuous loop. A frame 409 of the animated 2D barcode is shown.

Figure 5:
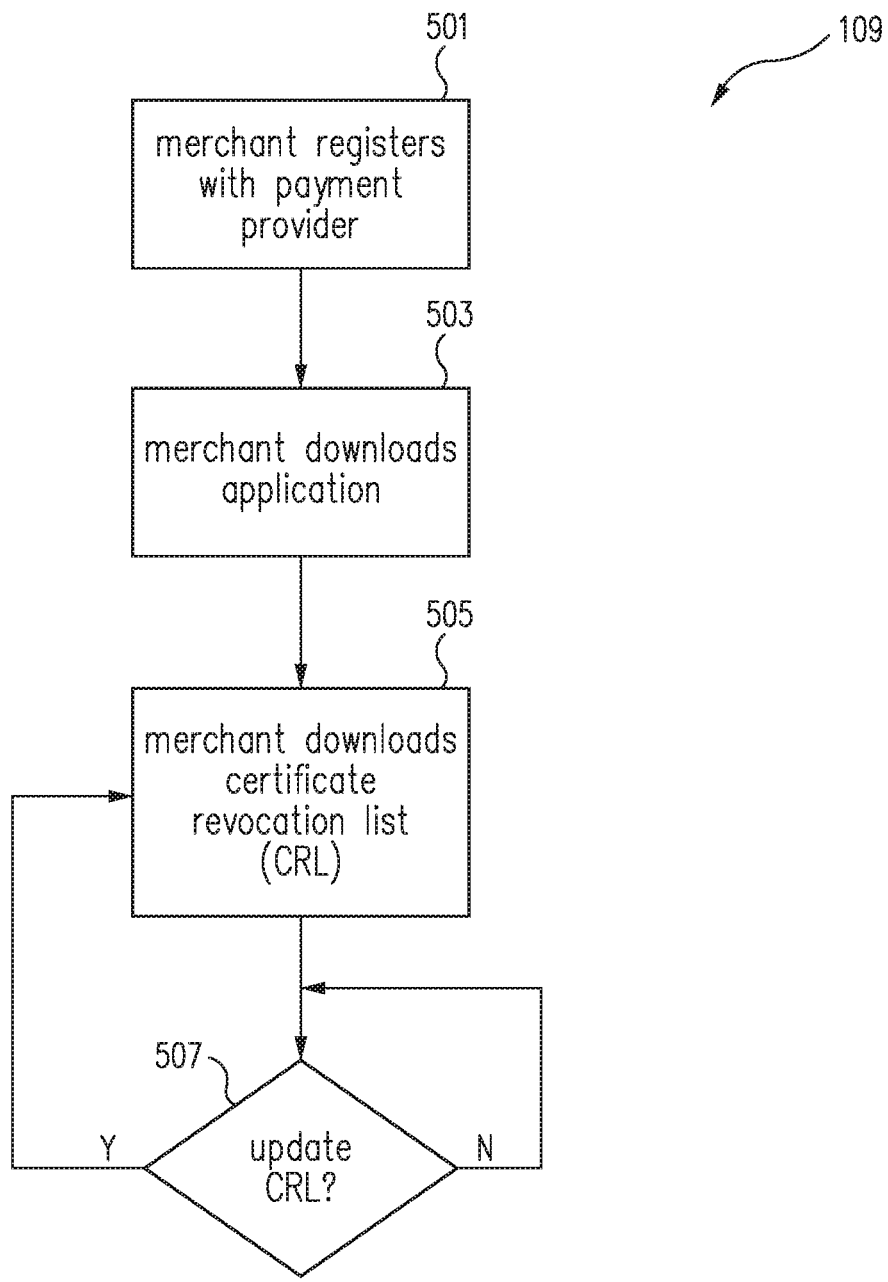
FIG. 5 shows a detailed flow chart of step 109 of FIG. 1 performed on a merchant's mobile device to communicate with a payment service provider to register an account and to receive a certificate revocation list (CRL) according to one or more embodiments of the present disclosure.

FIG. 5 shows a detailed flow chart of step 109 of FIG. 1 performed on a merchant's mobile device to communicate with a payment service provider to register an account and to receive a certificate revocation list (CRL) according to one or more embodiments of the present disclosure. In step 501, the merchant registers an account with the payment service provider to sign up to accept animated 2D barcode checks as payments. The merchant may register a mobile device such as a smart phone to receive 2D barcode checks. Alternatively, the merchant may use a point-of-sale (POS) terminal, or other types of computing devices as a hardware platform for receiving 2D barcode checks.

In step 503, the merchant downloads the payment verification application from the payment service provider for installation on the mobile device. The payment verification application enables the merchant to verify the validity of the signing key/certificate received from the payer and provides a user interface for the merchant to interact with the payment service provider. Because the merchant may verify the signing key/certificate without having Internet connectivity to the payment service provider, the CRL enables the merchant to recognize signing keys/certificates that should be rejected by the merchant when offline. For example, CRL may list the keys/certificates of mobile devices that are reported stolen or the keys/certificates determined by the payment service provider to be fraudulent. The payment service provider maintains the CRL and may update the CRL on a regular basis, such as daily, to keep the CRL current. In step 505, the merchant downloads the most current CRL from the payment service provider into the payment verification application. To keep the CRL on the mobile device current, in step 507, the payment verification application may automatically check for updates to the CRL on a periodic basis when the mobile device is online. If the CRL on the mobile device is out of date, the payment verification application downloads the most current CRL from the payment service provider.

Figure 6:
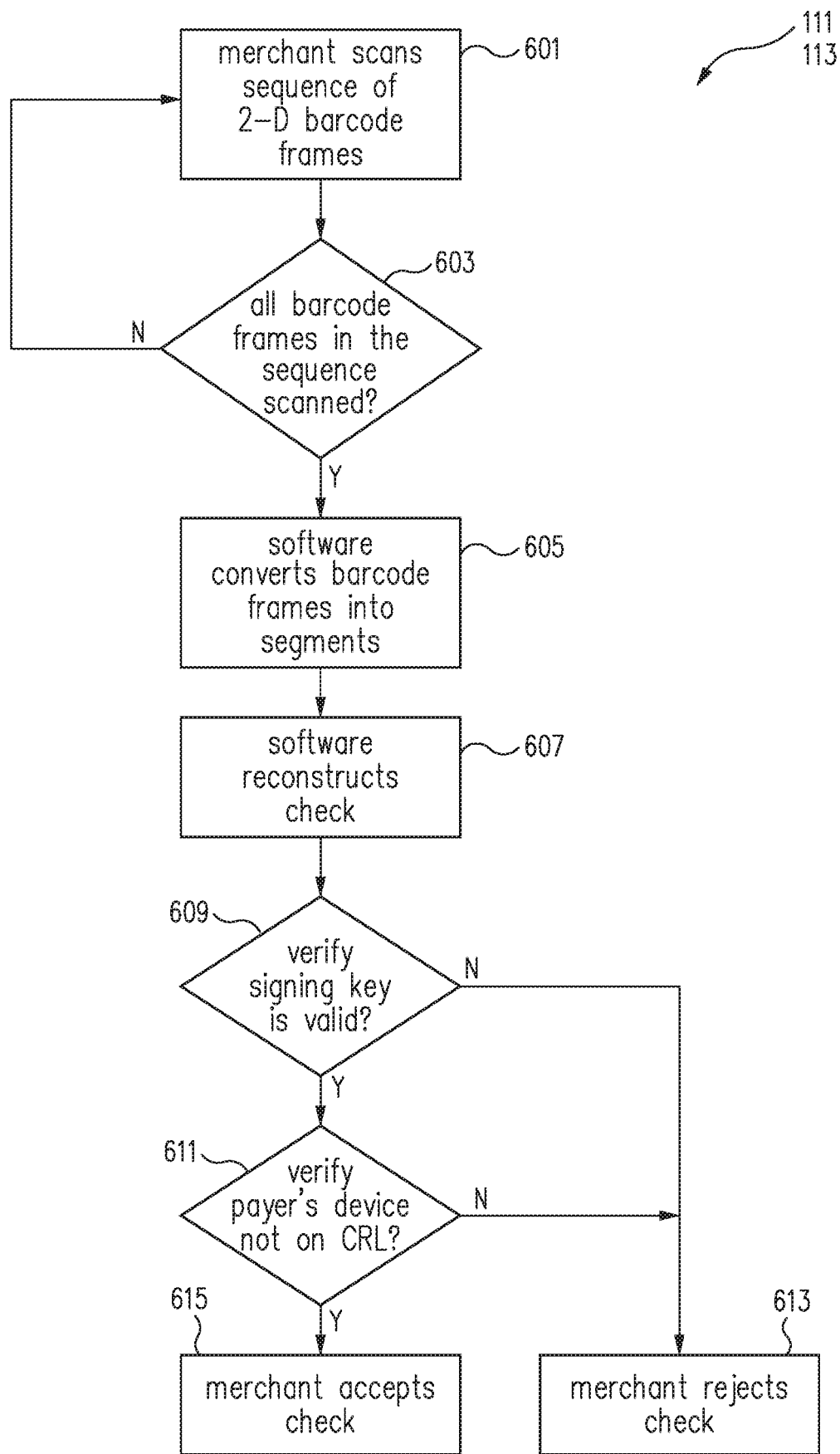
FIG. 6 shows a detailed flow chart of steps 111, 113 performed on a merchant's mobile device to scan and validate the animated 2D barcode check according to one or more embodiments of the present disclosure.

FIG. 6 shows a detailed flow chart of steps 111, 113 performed on a merchant's mobile device to scan and validate the animated 2D barcode check according to one or more embodiments of the present disclosure. In step 601, the merchant uses the camera and 2D barcode reading software on his/her mobile device to scan the sequence of 2D barcode check displayed on the payer's mobile device. Alternatively, the merchant may use a CCD scanner attached to a mobile device. Because the sequence of 2D barcodes is played in a continuous loop, scanning may start from any frame of the sequence until all frames of the sequence have been scanned. In step 603, the software determines if all frames in the sequence have been scanned. For example, the software may read and decode the prefix information from each frame that indicates the frame number and the total number of frames in the sequence. If the prefix information shows there is still more frame to scan, step 601 is invoked to scan the remaining frame. In addition, if the scanned frame has a decoding error, the software may re-scan the frame in step 601. In step 605, the software decodes and converts the scanned frames into data segments. In step 607, the software reconstructs the data segments using the prefix information into the signed data block of the check that includes the information for the check and the signed key/certificate. The reconstructed check may be passed to a payment processing layer of the payment verification application for processing.

In step 609, the payment processing layer verifies the signed key/certificate. For example, the payment processing layer may verify that the signed key/certificate is valid using the RSA algorithm and that it is certified by the payment service provider. The payment processing layer may also check the capability notations embedded into the signing key/certificate to verify that the signing key/certificate is valid for use with the payment transaction, e.g., that the signing key/certificate has not expired, that the payment amount does not exceed the maximum transaction amount, and/or that a maximum number of transactions has not been exceeded. Additional verification may include verifying that the payment amount and the merchant name, account number are correct. If the verification fails, the merchant rejects the check in step 613. The merchant's mobile device may display a message indicating that the check is rejected and the reason for the rejection. The merchant's mobile device may also send a message to the payer's mobile device about the rejection.

If the verification is successful, in step 611, the payment processing layer compares the signing key/certificate against the CRL to verify that the signing key/certificate is not on the CRL. The CRL lists signing keys/certificates that are revoked but are otherwise valid. As discussed earlier, the CRL may list the keys/certificates of mobile devices that are reported stolen or those determined by the payment service provider to be fraudulent. If the signing key/certificate appears on the CRL, the merchant rejects the check in step 613. Otherwise, the merchant accepts the check in step 615. The merchant's mobile device may display a message indicating that the check is accepted, or may send a message to the payer's mobile device indicating so. Note that because the CRL is only updated by the payment service provider on a periodic basis and downloaded to the merchant's mobile device only when there is Internet connectivity, the signing key/certificate of a recently stolen mobile device may not appear on the CRL in time for the merchant to reject the check received from the stolen mobile device. In this case, when the merchant presents the accepted check to the payment service provider for payment in step 115, the payment service provider may determine that the signing key/certificate should have been rejected. The payment service provider may accept the check and write off the amount based on the governing protection rules for the benefit of the merchant.

Although the above description focuses on using a sequence of 2D barcodes for a payment transaction, it will be appreciated that the idea of storing and communicating large amounts of data using two or more different barcodes in sequence is not limited to just financial transactions. In various embodiments, any type or use requiring communication of large amounts of data can employ ideas contained herein, where smaller amounts of data are stored and communicated in each barcode in a sequence, with the total sequence communicating the complete message or information. Furthermore, use need not be limited to mobile devices.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Application software in accordance with the present disclosure, such as program code and/or data for generating, receiving, or verifying the 2D animated barcode may be stored on one or more non-transitory computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although embodiments of the present disclosure have been described, these embodiments illustrate but do not limit the disclosure. It should also be understood that embodiments of the present disclosure should not be limited to these embodiments but that various alternate embodiments and/or modifications to the present invention, whether explicitly described or implied herein, are possible in light of the disclosure. For example, other types of payment instruments such as credit cards, debit cards, gift cards, coupons, or other types of financial transactions such as issuance of refunds or credits may be communicated using 2D animated barcode. In addition, devices other than mobile devices may also use 2D animated barcode to conduct financial transactions.

Having thus described embodiments of the invention, numerous modifications and variations may be made by one of ordinary skill in the art in accordance with the principles of the present disclosure and be included within the spirit and scope of the present disclosure as hereinafter claimed.

The invention claimed is:

1. A first mobile device comprising:
one or more hardware processors; and
a non-transitory memory storing merchant information comprising a name and an account of a merchant and instructions that, when executed by the one or more hardware processors, cause the one or more hardware processors of the first mobile device to perform operations comprising:
generating transaction data for encoding in separate ones of a first plurality of two-dimensional (2D) barcodes;
generating the first plurality of 2D barcodes based on a first portion of transaction data corresponding to a payment amount;
encoding the first plurality of 2D barcodes with the name and the account of the merchant;
displaying the encoded first plurality of 2D barcodes to a second mobile device via a display output of the first mobile device;
in response to the displaying, capturing a second plurality of 2D barcodes displayed in a continuous loop on the second mobile device, wherein each of the second plurality of 2D barcodes is encoded with a second portion of data and a sequential identifier;
determining a plurality of scanned frames presented on the first mobile device and comprising the second plurality of 2D barcodes;
decoding, from the plurality of scanned frames, the second portion of the data and the sequential identifier in each of the second plurality of 2D barcodes;
reconstructing the data from the second portions of the data based on the sequential identifiers decoded from the second plurality of 2D barcodes in the plurality of scanned frames;
determining, from the reconstructed data, payment information for a payment instrument with a payment service provider to the name and the account of the merchant for the payment amount and a certified public key;
downloading a certificate revocation list (CRL) by the first mobile device from the payment service provider, wherein the CRL lists one or more revoked keys;
validating, based on a capability notation embedded in the certified public key, the certified public key for use with the payment instrument; and
verifying the payment instrument based on the certified public key being found in the CRL.

2. The first mobile device of claim 1, wherein the verifying the payment instrument comprises:
comparing the certified public key against the one or more revoked keys on the CRL; and
rejecting the payment instrument if the certified public key matches with one of the revoked keys on the CRL.

3. The first mobile device of claim 1, wherein the operations further comprise:
determining if the CRL is out of date; and
updating the CRL from the payment service provider if the CRL is out of date.

4. The first mobile device of claim 1, wherein the certified public key comprises one or more capability notations that contain restrictions on use of the certified public key, and wherein the payment instrument is further verified using the capability notations.

5. The first mobile device of claim 1, wherein the payment instrument is verified offline without accessing the payment service provider.

6. The first mobile device of claim 1, wherein at least one of the first or the second 2D barcodes corresponds to at least one machine readable QR code.

7. A method comprising:
generating transaction data for encoding in separate ones of a first plurality of two-dimensional (2D) barcodes
generating the first plurality of 2D barcodes based on a first portion of transaction data corresponding to a payment amount;
encoding the first plurality of 2D barcodes with a name and an account of a merchant;
displaying the encoded first plurality of 2D barcodes to a second mobile device via a display output of a first mobile device;
in response to the displaying, capturing a second plurality of 2D barcodes displayed in a continuous loop on the second mobile device, wherein each of the second plurality of 2D barcodes is encoded with a second portion of data and a sequential identifier;
determining a plurality of scanned frames presented on the first mobile device and comprising the second plurality of 2D barcodes;
decoding, from the plurality of scanned frames, the second portion of the data and the sequential identifier in each of the second plurality of 2D barcodes;
reconstructing the data from the second portions of the data based on the sequential identifiers decoded from the second plurality of 2D barcodes in the plurality of scanned frames;
determining, from the reconstructed data, payment information for a payment instrument with a payment service provider to the name and the account of the merchant for the payment amount and a certified public key;

downloading a certificate revocation list (CRL) by the first mobile device from the payment service provider, wherein the CRL lists one or more revoked keys;

validating, based on a capability notation embedded in the certified public key, the certified public key for use with the payment instrument; and verifying the payment instrument based on the certified public key being found in the CRL.

8. The method of claim 7, wherein the verifying the payment instrument comprises:

comparing the certified public key against the one or more revoked keys on the CRL; and rejecting the payment instrument if the certified public key matches with one of the revoked keys on the CRL.

9. The method of claim 7, further comprising:

determining if the CRL is out of date; and updating the CRL from the payment service provider if the CRL is out of date.

10. The method of claim 7, wherein the certified public key comprises one or more capability notations that contain restrictions on use of the certified public key, and wherein the payment instrument is further verified using the capability notations.

11. The method of claim 7, wherein the payment instrument is verified offline without accessing the payment service provider.

12. The method of claim 7, further comprising:

processing the transaction data for the payment amount using the payment instrument with the payment service provider.

13. The method of claim 7, wherein at least one of the first or the second 2D barcodes corresponds to at least one machine readable QR code.

14. A non-transitory machine-readable medium comprising instructions which, in response to execution by one or more hardware processors of a computer system, cause the computer system to perform operations comprising:

generating transaction data for encoding in separate ones of a first plurality of two-dimensional (2D) barcodes;

generating the first plurality of 2D barcodes based on a first portion of transaction data corresponding to a payment amount;

encoding, the first plurality of 2D barcodes with a name and an account of a merchant;

displaying the first plurality of 2D barcodes to a second mobile device via a display output of a first mobile device;

in response to the displaying, capturing a second plurality of 2D barcodes displayed in a continuous loop on the second mobile device, wherein each of the second plurality of 2D barcodes is encoded with a second portion of data and a sequential identifier;

determining a plurality of scanned frames presented on the first mobile device and comprising the second plurality of 2D barcodes;

decoding, from the plurality of scanned frames, the second portion of the data and the sequential identifier in each of the second plurality of 2D barcodes;

reconstructing the data from the second portions of the data based on the sequential identifiers decoded from the second plurality of 2D barcodes in the plurality of scanned frames;

determining, from the reconstructed data, payment information for a payment instrument with a payment service provider to the name and the account of the merchant for the payment amount and a certified public key;

downloading a certificate revocation list (CRL) by the first mobile device from the payment service provider, wherein the CRL lists one or more revoked keys;

determining, based on a capability notation embedded in the certified public key, that the certified public key is valid for use with the payment instrument; and verifying the payment instrument based on the certified public key being found in the CRL.

15. The non-transitory machine-readable medium of claim 14, wherein the verifying the payment instrument comprises:

comparing the certified public key against the one or more revoked keys on the CRL; and rejecting the payment instrument if the certified public key matches with one of the revoked keys on the CRL.

16. The non-transitory machine-readable medium of claim 14, wherein the operations further comprise:

determining if the CRL is out of date; and updating the CRL from the payment service provider if the CRL is out of date.

17. The non-transitory machine-readable medium of claim 14, wherein the certified public key comprises one or more capability notations that contain restrictions on use of the certified public key, and wherein the payment instrument is further verified using the capability notations.

18. The non-transitory machine-readable medium of claim 14, wherein the payment instrument is verified offline without accessing the payment service provider.

19. The first mobile device of claim 1, wherein the generating the first plurality of 2D barcodes is further based on a maximum data size of each of the first plurality of 2D barcodes displayable by the first mobile device.

20. The method of claim 7, wherein the generating the first plurality of 2D barcodes is further based on a maximum data size of each of the first plurality of 2D barcodes displayable by the first mobile device.

* * * * *